Aug. 1, 1950

H. J. VON BAEYER

MULTIPLEX COMMUNICATION SYSTEM WITH CHANNELS OF DIFFERENT BAND WIDTHS 2,517,365

Filed April 14, 1947

3 Sheets-Sheet 1

Inventor

Hans Jakob von Baeyer,

By Pierce, Scheffler & Parker,

Attorneys.

Inventor:
Hans Jacob von Baeyer,

By Pierce, Scheffler + Parker,
Attorneys.

Inventor:
Hans Jacob von Baeyer,
By Pierce, Scheffler & Parker,
Attorneys.

Patented Aug. 1, 1950

2,517,365

UNITED STATES PATENT OFFICE 2,517,365

MULTIPLEX COMMUNICATION SYSTEM WITH CHANNELS OF DIFFERENT BAND WIDTHS

Hans Jakob von Baeyer, Baden, Switzerland, assignor to "Patelhold" Patentverwertungs-&-Electro-Holding A.-G., Glarus, Switzerland Application April 14, 1947, Serial No. 741,312
In Switzerland April 10, 1946

23 Claims. (Cl. 179—15)

This invention relates to multiplex systems for the transmission and reception of communications of widely different band widths, and particularly to multiplex systems of the type in which the communications, which may be speech or music, are transmitted as short pulses which may be modulated in amplitude, phase or width in accordance with the communications to be transmitted.

The communications to be transmitted are each broken up into a similar sequence of impulses which are equidistant in respect to time. The fundamental frequency of such a sequence is the reciprocal of the time interval between successive impulses and it is known that, for undistorted reproduction, the fundamental frequency should be at least twice that of the highest modulation frequency to be transmitted. The impulse sequences of the individual communications all have the same fundamental frequency, hence also the same time interval between adjacent impulses, but are so displaced with respect to each other that between each two successive impulses of one communication an impulse of all other communications to be transmitted is interposed. The fundamental frequency is preferably made as low as possible for distortionless transmission and reproduction since the power requirement decreases and the number of communications which may be transmitted increases as the fundamental frequency is lowered. No advantage results in an increase in the fundamental frequency above the minimum for undistorted transmission and reproduction.

Experience in long distance telephony has demonstrated that speech is clearly understandable when the upper limit of transmission is about 2500 cycles per second, and that excellent results are obtained when the upper limit of the frequency band is 3000 cycles per second. Good reproduction of music requires a transmission of frequencies in the wide band of from 30 to about 9000 cycles per second, and the ratio R of the frequency band width for music and speech is thus about 3:1. The problem frequently is encountered of selectively transmitting music and telephone conversations, or other speech, over a single multi-channel installation, but the prior multiplex communication systems have made no provision for the efficient transmission of both speech and music.

Objects of the present invention are to provide novel methods of and apparatus for the multiplex transmission and reception of communications of widely different band widths.

Objects are to provide multiplex communication methods and apparatus which are characterized by at least one impulse sequence having a fundamental frequency which is an integral multiple of the minimum impulse frequency for transmission of a communication of low band width, whereby a communication of wide band width may be transmitted and received without distortion, and by the cyclic suppression of certain impulses of the multiple frequency to reduce the effective impulse frequency of transmission to the minimum impulse frequency when communications of low band width are to be transmitted. Objects are to provide multiplex communication methods and apparatus characterized by one or more groups of channels over which individual speech communications are transmitted by a sequency of impulses, each group of channels being adapted to transmit a single musical communication without distortion.

These and other objects and the advantages of the invention will be apparent from the following specification when taken with the accompanying drawings in which:

Figs. 1 to 4 inclusive are charts illustrating the time-displacement of the series of signal impulses for individual communications;

Figure 1:
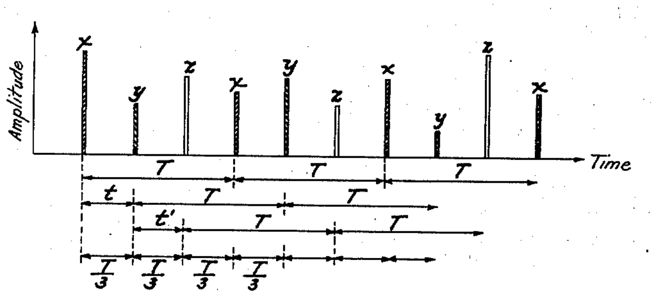

In Fig. 1, the reference characters $x$, $y$ and $z$ identify the narrow bands which represent the individual series of cyclically repeated impulses of three communications which are assumed to be telephone conversations or other speech in an audio frequency band of up to about 3000 cycles per second. The time distance T between successive impulses of each communication must be identical, but it is not essential that the time intervals $t$, $t'$ between adjacent impulses of different communications be identical. The time spacing T of successive impulses of each speech communication is the reciprocal $T = 1/6000$ second of the fundamental frequency F of 6000 cycles per second which will afford clearly understandable reproduction. If music is to be transmitted by the apparatus which, as indicated by the Fig. 1 chart, affords three channels for speech, all of the impulses must be modulated by the same modulating voltage, thereby resulting in a single impulse sequence with an impulse time-spacing of T/3 and a frequency of 3F. The music transmission will be satisfactory only when the three individual impulse sequences are accurately interfitted with respect to time, and this condition is obtained only with difficulty and through the use of complex apparatus. If the impulses are not uniformly spaced, the original time-spacing T will be controlling and will result in beating and interaction which will magnify noise to an inadmissible extent.

Figure 2:
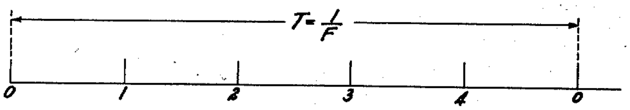

The Fig. 2 chart is a graphical presentation of a multiple channel impulse system of fundamental frequency T for the cyclic transmission of four speech impulses 1–4, and one synchronizing impulse 0. For simplicity of illustration, the several impulses are represented by lines of uniform length which do not indicate actual impulse form or amplitude. Assuming that it is desired to transmit not four, but twelve, speech communications it is apparent that two additional impulses must be interposed between each two impulses shown in Fig. 2. The fundamental frequency F is 6000 cycles per second, and the tripling of that frequency for the transmission of additional communications will treble the requirements for precision in the impulse positions with respect to time and external influences such as, for example, temperature variations which affect the time-position of the several impulses.

Figure 3:
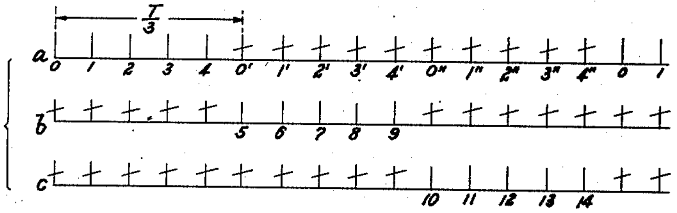

According to the present invention, a plurality of impulse sequences are produced, for example three identical impulse sequences $a$, $b$ and $c$ as shown in Fig. 3, and the fundamental frequency of the impulses is three times that of the impulse sequence shown in Fig. 2. There are four speech impulses and one synchronizing impulse per fundamental period T/3, so that the accuracy of the impulse positions referred to the fundamental period makes no greater demands than in the previous case of four speech impulses and one synchronizing impulse in the fundamental period.

The series of impulses in channel $a$ are marked 0–4, 0′–4′ and 0″ to 4″, respectively. If it is practical to suppress the impulses of two fundamental periods T/3 in each channel, and in staggered relation as indicated by the short inclined lines imposed on impulse lines in Fig. 3, it is possible to transmit three times the number of speech communications which can be handled by the Fig. 2 system, and with the same requirements as to precision in the timing of the impulses. Two additional speech communications can be transmitted since only one synchronizing impulse is required for the period T and the impulses at the time instants 0′ and 0″ may be modulated for the transmission of speech. Thus, instead of four conversations, fourteeen conversations may be transmitted.

As shown graphically in Fig. 3, a synchronizing impulse 0 and four conversations 1–4 are transmitted over channel $a$ during the first fundamental period T/3 when the impulses of channels $b$ and $c$ are suppressed. Similarly, five conversations 5–9 may be transmitted over channel $b$ during the next period T/3, and five conversations 10–14 may be transmitted over channel $c$ during the final period T/3 of the basic period T.

Figure 4:
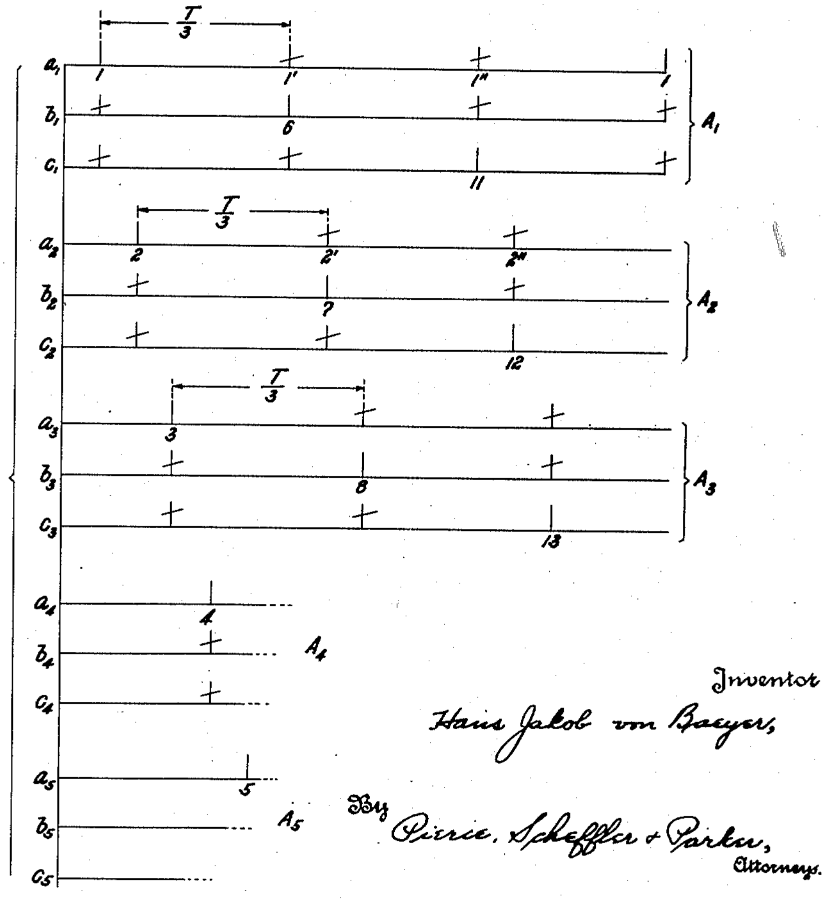

It is to be noted that a multiplex transmission system operating according to Fig. 3 will not offer any substantial advantage if the timing of the voltages for suppressing signal impulses introduces requirements as to precision which are more rigid than those for the timing of the impulse sequences. This, however, is not the case when the impulse sequences for synchronizing and for each conversation are developed in individual channels which each include a tube upon which voltage pulses are impressed to control the formation and transmission of the impulse sequences. The three multiplex channels $a$, $b$ and $c$ of Fig. 3 are thus subdivided into fifteen channels which each develop one impulse sequence of the period T/3, the channels being arranged in N=5 groups $A_1$ to $A_5$ comprising channels $a_1$, $b_1$, $c_1$; $a_2$, $b_2$, $c_2$; . . . $a_5$, $b_5$, $c_5$, respectively, as shown in Fig. 4. Two impulses of each cycle are suppressed in each channel during the transmission of speech, and the effective fundamental frequency is therefore T. The impulse sequences 0–4 are transmitted over lines $a_1$–$a_5$, the impulse sequences 5–9 are transmitted over lines $b_1$–$b_5$, and the impulse sequences 10–14 are transmitted over lines $c_1$–$c_5$ respectively.

Inspection of Fig. 4 shows that lines $b_1$ and $c_1$ must be blocked during the transmission of impulse 1, that the line $b_1$ must be released in somewhat less than T/3 second after the transmission of impulse 1 and then blocked again in somewhat less than T/3 seconds after the transmission of impulse 6. The same timing of the unblocking and blocking applies to all of the lines $a_1$ to $c_5$. By reference to Fig. 3, it will be seen that the line $b$ must be released in somewhat less than T/15 seconds between the impulses 4 and 5, and again blocked in somewhat less than T/15 seconds between the impulses 9 and 10. The Fig. 4 system thus has the advantage, as compared with the Fig. 2 system, that the number of conversations are greatly increased while the requirements are less rigid as to temperature constancy, ageing phenomena, voltage variations and so forth, all of which produce inconstancy of the impulse position with respect to the fundamental period. As compared with the Fig. 3 system, the advantage of the Fig. 4 system is that the same number of conversations may be transmitted with greatly reduced requirements as to the precise timing of the impulse blocking voltages.

A further advantage of the Fig. 4 system is that it is possible to transmit communications, for example music, having a substantially wider audio frequency band than that of telephone conversations or other speech. For this purpose, two of the lines of one of the groups remain blocked continuously and none of the impulses of the third line are suppressed. For example, lines $b_1$ and $c_1$ remain blocked while impulses 1, 1′ and 1″ are transmitted on line $a_1$ as an impulse sequence of the fundamental frequency T/3. This condition is correct for the distortionless transmission and reception of music having a top frequency which is three times the top frequency of speech transmission, and the transmission of a musical performance is thereby effected without increase in the noise factor by inaccurate impulse timing. The Fig. 4 system makes it possible to transmit, in addition to a synchronizing impulse sequence, either fourteen conversations, a maximum of four musical performances and two conversations, or other combinations which include three additional conversations for each reduction in the number of musical performances.

The invention is, of course, not restricted to the described triplication of the impulse fundamental frequency since a duplication or a higher multiple is just as readily possible without increase in the requirements for precise timing of the impulses. In the simplest case, when only one single-channel impulse sequence with a fundamental frequency double the minimum impulse frequency is produced, a communication of one band width may be transmitted by suppressing alternate impulses or the communication may be transmitted with double that band width by omitting the suppression. The sequence of the impulse can of course be changed at will by changing the phase relation of the blocking voltages impressed upon the several lines.

Figure 5:
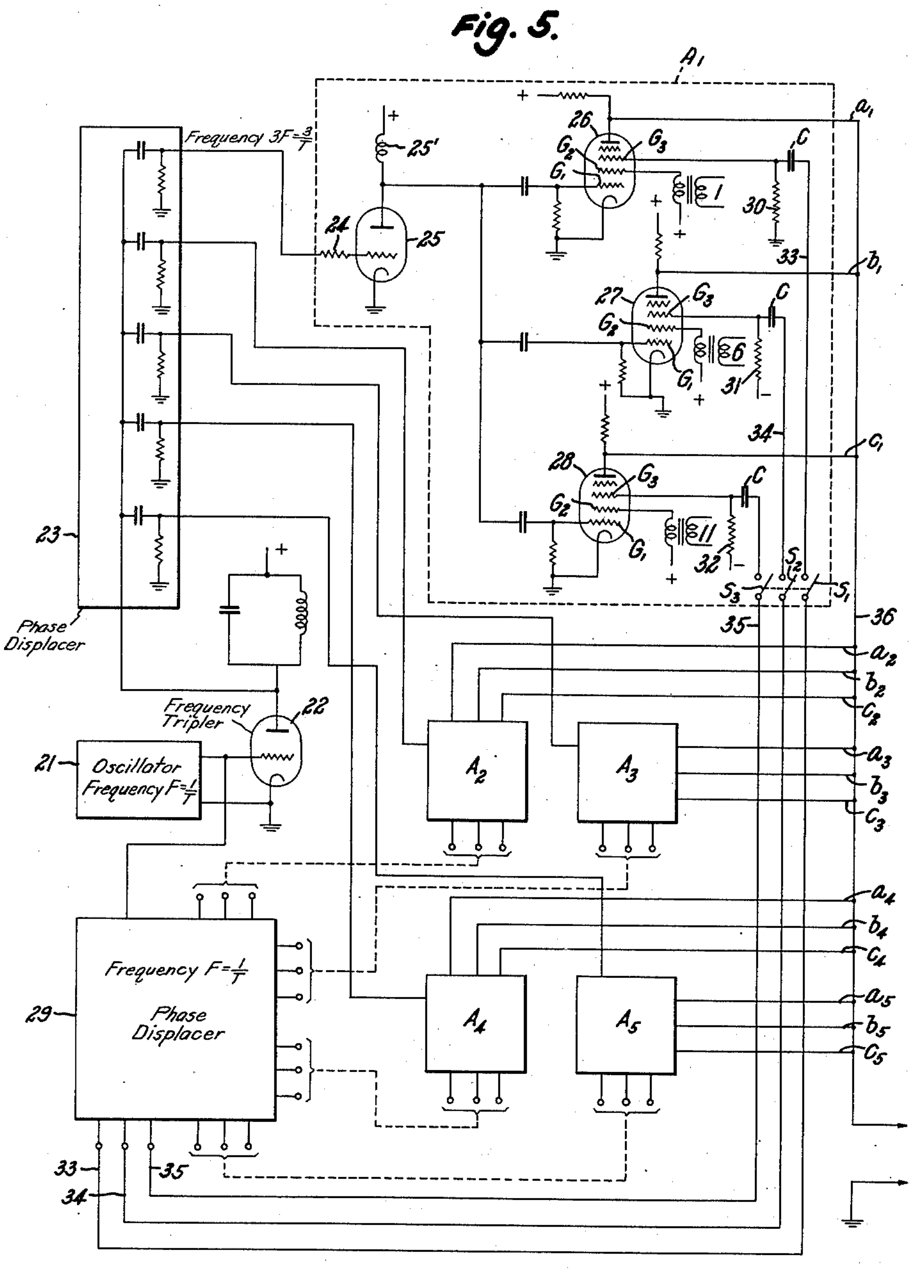
Fig. 5 is a circuit diagram of multiplex transmission apparatus embodying the invention.

A practical circuit arrangement for carrying out the process according to the Fig. 4 system is illustrated in Fig. 5. A generator 21 develops a sinusoidal voltage of frequency F which corresponds to double the maximum modulation frequency required for the transmission of conversations. The period T of this oscillator therefore corresponds, in the assumed case of a maximum speech frequency of 3000 cycles per second, to a duration of $^1/_{6000}$ of a second and its frequency is 6000 cycles per second. This frequency is trebled in a tube 22, whereby the fundamental frequency 3F is developed for impulse production corresponding to the period T/3 of Fig. 4. A phase-displacer 23 produces five different phase positions of this alternating voltage which are supplied respectively to the five similar groups $A_1$ to $A_5$ of three impulse sequence lines. The group $A_1$ includes the several circuit elements within the dotted enclosing line, and the groups $A_2$ to $A_5$ which are indicated as blocks each include a similar set of circuit elements.

A sinusoidal voltage tapped from the phase displacer 23 is fed through a resistor 24 to the grid of a tube 25. Grid current flows during the positive half period of the applied voltage and, due to the sharp bend of the characteristic of the negative half period, the anode current of tube 25 is of trapezoidal form and short voltage peaks or impulses of the period T/3 are set up at the anode end of the choke 25' in the anode circuit. These voltage impulses are impressed in parallel on the control grids $G_1$ of similar modulator tubes 26, 27 and 28. Modulating voltages corresponding to communications 1, 6 and 11 of lines $a_1$, $b_1$ and $c_1$ of Fig. 4 are impressed upon the grids $G_2$ of the tubes 26, 27 and 28, respectively. Blocking voltages for suppressing certain of the modulated impulses are impressed upon the grids $G_3$ of the several tubes, the timing of the blocking and unblocking of the tubes being determined by a phase-displacer 29 to which an input voltage of frequency $$F=\frac{1}{T}$$

is supplied from the oscillator generator 21. The blocking grids $G_3$ may be normally at potentials appropriate for conduction, in which case timed negative voltage pulses will be applied to the grids to block conduction. Alternatively, the blocking grids $G_3$ may be normally at negative potentials which block conduction, in which case timed positive potential pulses will be imposed upon the grids to render the tubes conductive. It is convenient to employ both types of control in each group and, as illustrated, the grid $G_3$ of tube 26 is connected to ground through resistor 30, and grids $G_3$ of tubes 27 and 28 are connected through resistors 31, 32 respectively to a source of negative potential which is indicated by the symbol "—." Tube 26 in line $a_1$ is normally conductive, while tubes 27 and 28 in lines $b_1$ and $c_1$ are normally blocked. The desired suppression of certain impulses of each line is effected by properly timed voltage impulses delivered to the blocking grids $G_3$ from the phase-displacer 29 over leads 33, 34 and 35 in which condensers C and switches $S_1$, $S_2$ and $S_3$ respectively are located. Negative voltage impulses are impressed upon grid $G_3$ of tube 26 over lead 33 to suppress impulses 1' and 1'', see Fig. 4, when three conversations are to be transmitted by the group $A_1$ lines, and positive voltage impulses are imposed on grids $G_3$ of tubes 27 and 28, over leads 34 and 35 respectively, to drive the grids to positive potentials cyclically for the transmission of the impulse sequences 6 and 11 respectively.

The described circuit network of group $A_1$ is duplicated in each of the groups $A_2$ to $A_5$, thus providing the fifteen lines $a_1$ to $c_5$ which all terminate on a common lead 36 by which the interleaved impulse sequences are conveyed to a transmitter or other circuit device. The networks of groups $A_1$ to $A_5$ are preferably constructed as independent unit assemblies.

The method of operation of the Fig. 5 apparatus will be apparent from a consideration of the Fig. 4 diagram. For the transmission of synchronizing impulses and fourteen conversations, the switches $S_1$, $S_2$, $S_3$ of all of the groups are closed. Modulating voltages are impressed upon the grids $G_2$ of tubes 26, 27 and 28 by the conversations 1, 6 and 11 respectively, and the modulating voltages of other conversations are similarly impressed upon the grids of tubes of the groups $A_2$ to $A_5$. Voltage pulses of the period T/3 are supplied to the grids $G_1$ of the series of the series of modulating tubes from the phase-displacer 23, thus tending to develop in each line $a_1$ to $c_5$ an impulse sequence of period T/3. Only one out of each series of three impulses in each sequence is actually transmitted since conduction through each modulating tube is cyclically blocked and unblocked by control voltage pulse of period T derived from the phase displacer 29. In line $a_1$ for example, the impulses 1' and 1'' are suppressed by negative voltage impulses imposed upon grid $G_3$ of tube 26. The fundamental frequency of the impulse sequence of conversation 1 is thus reduced from frequency 3F to frequency F=6000 cycles per second.

Musical performances may be transmitted without distortion or clipping by opening the switches $S_1$, $S_2$ and $S_3$ in the leads over which the voltage pulses for controlling signal impulse suppression are delivered to the modulating tubes of not more than four groups. This adjustment of the switches for group $A_1$ is illustrated in Fig. 5. The tube 26 in line $a_1$ is thus continuously conductive and will transmit the modulated impulses 1, 1' and 1'', while the tubes 27 and 28 in lines $b_1$ and $c_1$ are continuously blocked by the negative voltages on their grids $G_3$. The frequency of modulated impulses 1, 1' and 1'' is 3F=18,000 cycles per second, which is the condition appropriate for the transmission of musical performances having a maximum audio frequency of up to about 9000 cycles per second.

Additional groups may be adjusted for the transmission of musical performances, but at least one of the groups $A_1$ to $A_5$ must be operated at the fundamental frequency F for the transmission of a synchronizing impulse sequence. Two conversations may of course be transmitted on the other lines of that group.

Figure 6:
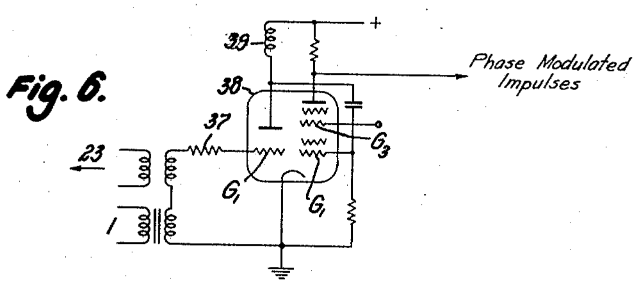
Fig. 6 is a diagram of a circuit which may be substituted in the Fig. 5 apparatus to develop phase-modulated impulses.

If the amplitude-modulated impulse sequence is to be converted into a phase-modulated sequence, the described circuit networks of the groups $A_1$ to $A_5$ will be found suitable for this purpose. In such a case it is expedient to associate each group of three lines with a separate converter, as then the impulses will follow one another within one converter at the time distance T/3 which is, of course, more favorable than if, for instance the channels *a* were grouped together, in which case the time distance of the impulses would be only T/15. The impulses can, of course, also be directly phase-modulated, for which purpose the modulation tubes 26, 27 and 28 of Fig. 5 will be replaced by the circuit arrangement according to Fig. 6.

The impulse voltages taken, say through separating tubes, from the phase displacer 23 of Fig. 5 are conveyed in series with the modulation voltages of the separate communications through a resistance 37 to the grid $G_1$ of a triode-hexode 38. Here they produce at the anode choke 39 short impulses, the phase position of which varies proportionally to the modulation voltage, since the passage of the sinusoidal alternating voltage of the period T/3 through the zero point is displaced in conformity with the modulation voltage. These phase-modulated impulses are impressed upon the control grid $G_1$ of the hexode tube, to the third grid $G_3$ of which the blocking voltages are applied in the same manner as to the grids $G_3$ of the tubes of Fig. 5. At the output connection $a_1$ phase-modulated impulses are thus obtained, which are collectively conveyed from all the modulators to the transmitter.

The impulse serving the purpose of synchronization is in a known manner made, for instance, wider, whereby it can be differentiated on the reception side from the others. By a suitable choice of, for instance the differential choke 39 this can easily be effected. For the synchronizing impulse the modulation is preferably omitted, although a modulation of one impulse side is quite possible.

In the receiver the impulses of the individual communications must be sorted out from the arriving sequence and passed on separately to individual reproducers or recorders. In the receiver an impulse sequence is produced which is identical with that of the transmitter, this sequence being synchronized with the transmitter impulse sequence by the synchronizing impulse emanating from the transmitter. Through this impulse sequence on the receiving side of the arriving transmitted impulses are separated and are then further dealt with in a known manner.

Figure 7:
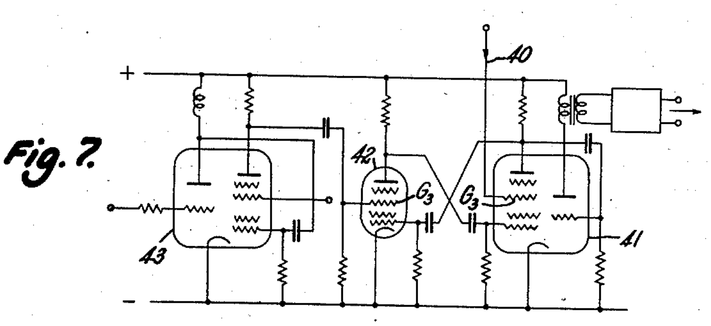
Fig. 7 is a fragmentary circuit diagram of apparatus for the reception of a transmitted communication.
Figure 8:
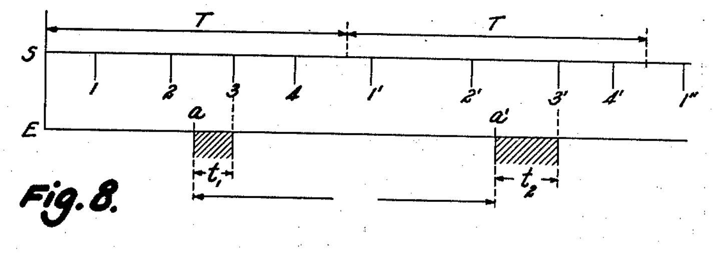
Fig. 8 is a chart showing the time-relationship of phase-modulated impulses at the receiver.

This impulse separation on the receiving side shall now be explained by a constructional example with reference to Figs. 7 and 8. After amplification the transmitted signal impulses are delivered over lead 40 to the grid $G_1$ of the hexode part of the triode-hexode tube 41 in such a manner as to give the grid a negative charge. The hexode section of tube 41 forms together with the hexode 42 a multi-vibrator arrangement, the natural frequency of which lies considerably below the fundamental frequency of the impulse sequence. To the grid $G_3$ of the hexode 42 are conveyed the voltage impulses produced on the receiving side, which voltage impulses are synchronized with the arriving signal impulses, and also in such a manner as to charge the grid in the negative sense. The production of these voltage impulses takes place in exactly the same way as on the transmitting side except that the modulation is omitted, for instance in the triode-hexode 43. The tetrode section of tube 41 is normally blocked and does not transmit signal voltage impulses which arrive over conductor 40, and the tetrode section is periodically unblocked by anode current surges set up in tube 42 by the locally generated control voltage pulses. The flip-flop circuit connections of tubes 41 and 42 are such that a voltage impulse to either tube will establish conduction momentarily, thereby blocking that tube and unblocking the other tube. A control voltage pulse on grid $G_3$ of tube 42 thus unblocks the tetrode section of tube 41, and the next incoming modulated voltage impulse is amplified and passed to the grid of the triode section of tube 41. The tube 42 is unblocked by the amplified incoming signal, and the tube 41 is simultaneously blocked and remains blocked until the next control voltage pulse arrives at tube 42. The sense of conduction of tubes 41 and 42 thus swings back and forth at the frequency of the impulse sequence of the incoming communication.

Fig. 8 shows the relation with respect to time of the two impulses 3, 3': Reference chracter S identifies a transmission impulse sequence of the fundamental period T with, for instance, four communications 1—4, 1'—4', etc. As these impulses are phase-modulated, they do not follow at equal intervals as was the case for the amplitude-modulated impulses of Figs. 1—4. The impulse sequence produced on the receiving side in a channel E is to select the communication 3. With the arrival of the impulse *a*, the tube 41 is opened and remains open during the time $t_1$ until the impulse 3 again blocks the tube. The same action is repeated between the impulses *a'* and 3' during the time $t_2$. According to the modulation of the impulses 3, 3' the intervals $t_1$, $t_2$ will be of different length. These width-modulated impulses *a*, *a'* are amplified in the triode part of the tube 41 and, after passing through a deep pass filter F are conveyed to the receiver or reproducer. The locally generated voltage impulses thus effect simultaneously the separation and demodulation of the phase-modulated transmitter impulses.

I claim:

1. In the operation of a multiplex communication system of the type including a plurality of lines in each of which means is provided for developing modulated impulses for transmission over a common channel, the process which comprises developing in each line an impulse sequence of a frequency which is an integral multiple of the minimum impulse frequency which affords distortionless reproduction of a communication of relatively narrow band width, cyclically supressing certain impulses of the sequences developed in a plurality of said lines to reduce the frequency of the impulses transmitted by those lines to said minimum impulse frequency, and transmitting all of the impulses developed in another line, whereby a communication having a relatively wide band width may be transmitted without distortion over said last-mentioned line.

2. In the operation of a communication system of the type including a plurality of groups of lines having in each line means for developing modulated impulses for transmission over a common channel, the number of lines of each group being equal to substantially the ratio R of the top frequencies of two communications of different band widths to be transmitted; the process which comprises transmitting individual communications of relatively narrow band width over the several lines of one of said groups, and transmitting a single communication of relatively wide band width over a single line of a second group by suppressing the transmission of communications over the other lines of said second group.

3. In a multiplex communication system, the combination with means providing a plurality of groups of communication lines terminating on a common channel, the number of lines of each group being equal to substantially the ratio R of the top frequencies of two communications of different band widths, means in each line for developing impulses of frequency RF, where F is the fundamental impulse frequency which affords distortionless transmission and reception of a communication of relatively narrow band width, of means manually adjustable to condition one of said groups of communication lines for the transmission of a separate communication of narrow band width over each line of that group or, alternatively, for the transmission of a single communication of wide band width over one line of that group, said manually adjustable means including means to suppress the transmission of impulses over R—1 lines of that group when adjusted to transmit a single communication of wide band width over the remaining line of that group.

4. In a multiplex communication system, means providing a plurality of communication lines terminating on a common channel, means in each line for developing modulated impulses of frequency RF, where R is an integer and F is the fundamental impulse frequency which affords distortionless reproduction of a communication of relatively narrow band width, means for suppressing impulses in each of said lines to reduce the fundamental impulse frequency to frequency F, and means adjustable to prevent the suppression of impulses in one line and to suppress all impulses in R—1 other lines, thereby to condition said system for the distortionless transmission of a communication having a top frequency substantially equal to R times the top frequency of the communication of narrow band width.

5. In a multiplex communication system, the combination with a group of communication lines which each include an electronic tube, means for simultaneously impressing upon said tubes cyclic voltage impulses of a preselected frequency which is a multiple of the minimum impulse frequency required for the distortionless transmission of a communication of narrow band width, means for individually modulating the sequence of voltage impulses of the respective communication lines with different communications, and a common channel to which said communication lines are connected in parallel; of means for suppressing the transmission to said common channel of certain of said voltage impulses to limit the number of voltage impulses reaching said common channel to a single voltage impulse for each cycle of said preselected frequency.

6. In a multiplex communication system, the invention as recited in claim 5, wherein said transmission-suppressing means includes means for suppressing voltage impulses in each communication line to reduce the frequency of the voltage impulse sequence transmitted thereby to said minimum impulse frequency.

7. In a multiplex communication system, the invention as recited in claim 6, in combination with means for adjusting said transmission-suppressing means to pass all voltage impulses in one communication line and to suppress all voltage impulses in the remaining communication lines, whereby a communication of relatively wide band width may be transmitted without distortion.

8. In a multiplex communication system, the invention as recited in claim 5, wherein said transmission-suppressing means comprises means for developing phase-displaced voltages of a frequency equal to said minimum impulse frequency, and means for impressing said phase-displaced voltages upon the several electronic tubes to control the transmission thereof.

9. In a multiplex communication system, the invention as recited in claim 8, wherein a source of sinusoidal alternating voltage of the frequency of said minimum impulse frequency energizes said means for developing phase-displaced voltages, in combination with a frequency multiplier connected to said voltage source; said means for impressing cyclic voltage impulses on said tubes being energized by said frequency multiplier.

10. In a multiplex communication system, the invention as recited in claim 5, wherein said means for impressing cyclic voltage impulses upon said tubes comprises a single voltage-peaking tube having an output circuit to which said tubes are connected in parallel.

11. In a multiplex communication system, the invention as recited in claim 5, wherein each of said tubes is a triode-hexode, the triode section being included in said means for impressing cyclic voltage impulses on the hexode section of the tube, and the hexode section having a grid upon which transmission-controlling voltages are impressed by transmission-suppressing means.

12. In a multiplex communication system, the invention as recited in claim 5, wherein said tubes have grids upon which voltage pulses are impressed to control the transmission of impulses, said transmission-suppressing means includes means for developing a plurality of phase-displaced voltage pulses of a frequency equal to said minimum impulse frequency, leads for conducting said phase-displaced voltage pulses to said grids of the several tubes, and switches in said leads.

13. In a multiplex communication system, the invention as recited in claim 12, wherein the grid of said tube in one communication line is normally at a voltage appropriate for conduction by said tube, the grids of said tubes of the remaining communication lines being normally at negative potentials which block conduction, whereby the opening of said switches results in the transmission of all voltage impulses developed in said one communication line and the suppression of all voltage impulses developed in the remaining communication lines.

14. In a multiplex communication system, the invention as recited in claim 5, wherein the voltage impulses impressed upon said tubes are amplitude-modulated, in combination with means for converting said amplitude-modulated impulses to phase-modulated impulses.

15. In a multiplex communication system, the invention as recited in claim 14, wherein said converting means comprises a single modulation converter for all communication lines of said group.

16. In a multiplex communication system, the invention as recited in claim 5, wherein means is provided for direct phase-modulation of the voltage impulses.

17. In a multiplex communication system, transmitting apparatus comprising a plurality of communication lines arranged in groups each including the same number N of lines, each line including an electronic tube and all of said tubes having output circuits connected in parallel to a common channel, means for developing in each communication line a voltage impulse sequence of a fundamental frequency N times the minimum fundamental frequency for distortionless transmission of a communication of narrow audio frequency band width, the impulses of all lines of each group coinciding as to time and the impulses of different groups being staggered, means for modulating the several voltage impulse sequences with different communications, and means for selectively suppressing voltage impulses within each group of communication lines, said suppressing means including means adjustable to transmit from each group N communications of narrow audio band width by impulse sequences of said minimum fundamental frequency or alternatively a single communication of wide audio frequency band width by an impulse sequence of a frequency N times said minimum fundamental frequency.

18. In a multiplex communication system, the invention as recited in claim 17, wherein said means for developing voltage impulse sequences comprises a source of alternating voltage of a frequency equal to N times said minimum impulse frequency, means for developing phase-displaced voltages from said source, and means for impressing the several phase-displaced voltages upon the respective groups of communication lines.

19. In a multiplex communication system, the invention as recited in claim 17, wherein said means for suppressing voltage impulses comprises a source of alternating voltage of a frequency equal to said minimum impulse frequency, means for developing phase-displaced voltages from said source, and means for impressing the several phase-displaced voltages upon the tubes of the respective communication lines.

20. In a multiplex communication system, the invention as recited in claim 17, wherein a single source of sinusoidal alternating voltage of the said minimum impulse frequency energizes said means for developing voltage impulse sequences and said means for suppressing voltage impulses; a frequency multiplier being connected between said source and said means for developing voltage impulse sequences.

21. In a multiplex communication system, the invention as recited in claim 17, in combination with receiving apparatus including a plurality of communication lines equal in number to the communication lines of said transmitting apparatus, means for impressing upon said communication lines of the receiving apparatus control voltage pulses synchronized with the voltage impulse sequences of the respective corresponding communication lines of the transmitting apparatus.

22. In a multiplex communication system, the invention as recited in claim 21, wherein each communication line of said receiving apparatus includes a pair of tubes and a circuit network connecting the same for flip-flop operation, means for impressing the received voltage impulse sequence upon one tube of said pair to control conduction in one direction, and means for impressing the control voltage pulses upon the other tube of said pair to control conduction in the opposite direction.

23. In a multiplex communication system, the invention as recited in claim 22, wherein each tube of each of said pairs is a hexode having a plurality of grids, one grid of each tube being coupled to the anode of the other tube of that pair, and said circuit networks including means for impressing said voltage impulse sequences and control voltage pulses upon other grids of the said tubes.

HANS JAKOB VON BAEYER.

REFERENCES CITED

The following references are of record in the file of this patent:

UNITED STATES PATENTS

| Number | Name | Date |
|---|---|---|
| 2,048,081 | Riggs | July 21, 1936 |
| 2,094,132 | Miller | Sept. 28, 1937 |
| 2,163,939 | Dillenburger | June 27, 1939 |
| 2,263,369 | Skillman | Nov. 18, 1941 |
| 2,277,192 | Wilson | Mar. 24, 1942 |
| 2,401,384 | Young, Jr. | June 4, 1946 |
| 2,405,252 | Goldsmith | Aug. 6, 1946 |
| 2,408,077 | Labin | Sept. 24, 1946 |
| 2,418,116 | Grieg | Apr. 1, 1947 |
| 2,429,631 | Labin | Oct. 28, 1947 |
| 2,454,815 | Levy | Nov. 30, 1948 |
| 2,455,617 | Shepard | Dec. 7, 1948 |
| 2,495,739 | Labin | Jan. 31, 1950 |

FOREIGN PATENTS

| Number | Country | Date |
|---|---|---|
| 555,993 | Great Britain | Mar. 12, 1942 |